United States Patent [19]

Uchiyama et al.

[11] Patent Number: 4,836,417

[45] Date of Patent: Jun. 6, 1989

[54] APPARATUS FOR CONTINUOUS SUPPLY OF FINE POWDER, VISCOUS FLUID OR THE LIKE AT A CONSTANT RATE

[75] Inventors: Futoshi Uchiyama, Kashiwa; Koichi Tsukamoto; Tomoyoshi Kurashige, both of Tokyo; Kaoru Furusawa, Kawasaki; Mitsumaro Koike, Tokyo, all of Japan

[73] Assignees: Agency of Industrial Science and Technology; Ministry of International Trade and Industry, both of Tokyo, Japan

[21] Appl. No.: 237,412

[22] Filed: Aug. 29, 1988

[30] Foreign Application Priority Data

Aug. 31, 1987 [JP] Japan ................................ 62-217152

[51] Int. Cl.$^4$ ................................................ B67D 5/08
[52] U.S. Cl. ........................................ 222/63; 222/198
[58] Field of Search ................... 222/52, 63, 196, 198, 222/200, 202–203, 58

[56] References Cited

U.S. PATENT DOCUMENTS 4,195,260  3/1980  Sakamoto et al. ............. 222/DIG. 1
4,381,545  4/1983  Biddle, III et al. ............... 222/63 X
4,472,091  9/1984  Callahan ......................... 222/196 X

FOREIGN PATENT DOCUMENTS 981122  12/1982  U.S.S.R. .............................. 222/198

Primary Examiner—Michael S. Huppert.
Attorney, Agent, or Firm—Oblon, Spivak, McClelland, Maier & Neustadt

[57] ABSTRACT

An apparatus for continuously supplying fine powder at a constant rate comprises a hopper for holding the fine powder, a first piezoelectric transducer disposed on the diaphragm for supplying vibration to cause discharge of the fine powder therefrom, a second piezoelectric transducer for detecting change in the frequency of vibration of the hopper with change in the amount of fine powder contained in the hopper and feeding the detected signal back to a driver for the first piezoelectric transducer so as to supply vibration to the hopper at a frequency determined on the basis of the amount of fine powder contained in the hopper.

5 Claims, 4 Drawing Sheets

APPARATUS FOR CONTINUOUS SUPPLY OF FINE POWDER, VISCOUS FLUID OR THE LIKE AT A CONSTANT RATE

BACKGROUND OF THE INVENTION

1. Field of the Invention

This invention relates to an apparatus for continuously applying fine powder, viscous fluid or the like at a constant rate, and more particularly to such an apparatus which can control the continuous discharge of fine powder, viscous fluid or the like from a hopper at a constant rate on the microgram order, and still more particularly to such an apparatus which conducts such controlled discharge by applying vibration to a hopper containing fine powder, viscous fluid or the like.

2. Prior Art Statement

In conventional apparatuses for supplying fine powder, viscous fluids etc. (hereinafter referred to collectively as "fine powder") a buffer plate or screw provided in a hopper containing the fine powder is rotated to facilitate smooth discharge of the fine powder without formation of a fine powder bridge at the hopper outlet and the rate of fine powder discharge is controlled on the basis of change in the combined weight of the supply apparatus and the fine powder contained therein.

The conventional apparatus has a buffer plate or screw within the hopper and further has to be equipped with a motor for the buffer plate or screw and a computer for controlling the rotation of the motor and the like. Its overall weight is thus relatively large. Therefore, where the conventional method of controlling the rate of fine powder discharge on the basis of change in weight of the overall apparatus is used, the degree of control of the fine powder discharge rate is limited to, at best, the gram order.

OBJECT AND SUMMARY OF THE INVENTION

The object of this invention is to provide an apparatus for continuously supplying fine powder at a constant rate with a degree of control of the rate of fine powder discharge on the microgram order.

This invention attains this object by providing an apparatus for continuously supplying fine powder at a constant rate comprising a hopper for holding the fine powder and having a minute discharge orifice, a diaphragm for supporting the hopper, a first piezoelectric transducer disposed on the diaphragm for supplying vibration to the hopper and causing discharge of the fine powder from the discharge orifice, a driver for driving the first piezoelectric transducer, a second piezoelectric transducer disposed on the diaphragm for detecting change in the frequency of vibration of the hopper with change in the amount of fine powder contained in the hopper and feeding the detected signal back to the driver for the first piezoelectric transducer.

The rate of fine powder discharge from the hopper is determined by three parameters: the frequency of the vibration applied by the first piezoelectric transducer, the voltage applied to the first piezoelectric transducer and the diameter of the discharge orifice. The vibration frequency is in turn determined by the spring constant of the diaphragm supporting the hopper and the weight of the fine powder contained the hopper. Thus the vibration frequency varies in proportion as the weight of the hopper changes with discharge of fine powder therefrom. The second piezoelectric transducer continuously detects the vibration frequency of the hopper. The apparatus has a memory in which the relationship between the amount of fine powder in the hopper and the frequency of hopper vibration is stored in advance. The vibration frequency detected by the second piezoelectric transducer can thus be used to read out the amount of fine powder contained in the hopper and from the change in this amount over time it is possible to determine the rate of discharge of the fine powder. The so-determined rate of discharge is compared with the desired set rate of discharge and if there is a difference between these two rates, the frequency of the drive signal from the driver for the first piezoelectric transducer is controlled to return the rate to the set rate.

As the detection of the vibration frequency of the second piezoelectric transducer and the control of the vibration frequency of the first piezoelectric transducer can be conducted with high precision, the rate of continuous supply of the fine powder can be controlled on the $\mu$g order.

The above and other objects and features of the invention will become more apparent from the following detailed description with reference to the accompanying drawings.

DETAILED DESCRIPTION OF THE PREFERRED EMBODIMENTS

Figure 1:
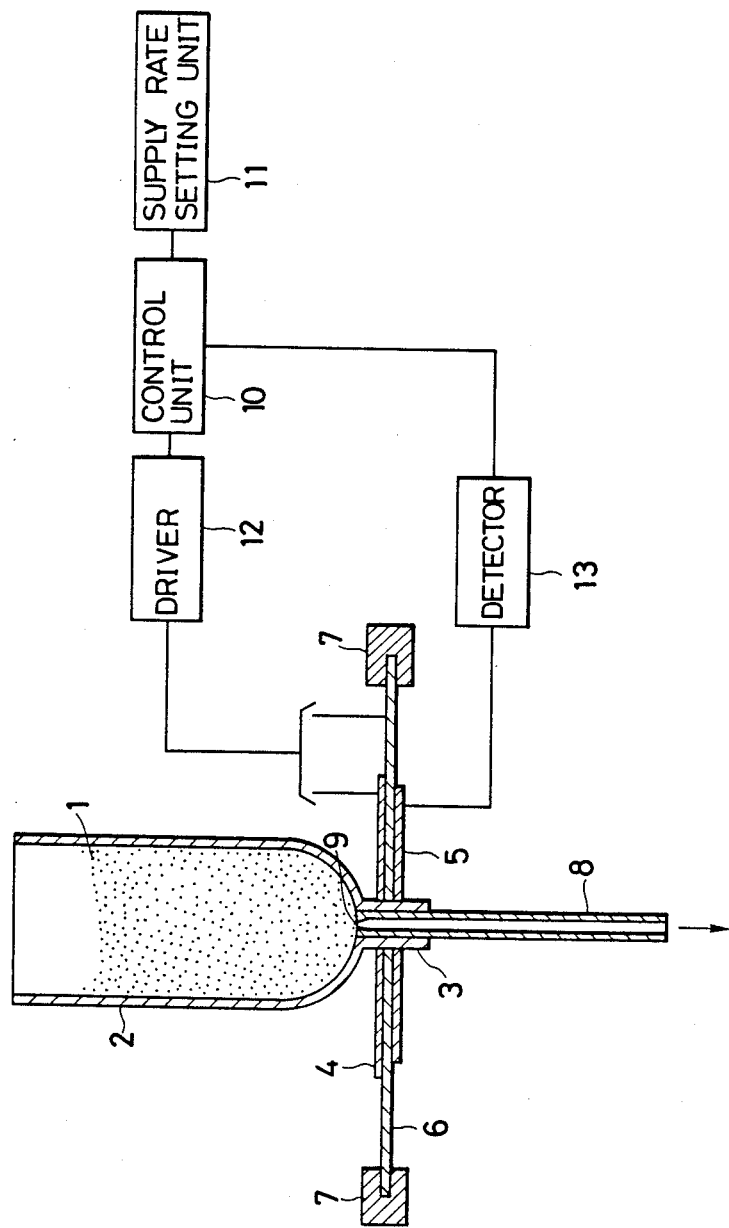
FIG. 1 is a schematic view of the structure of a first embodiment of the apparatus for continuous supply of fine powder, viscous fluid or the like at a constant rate according to the invention.
Figure 2:
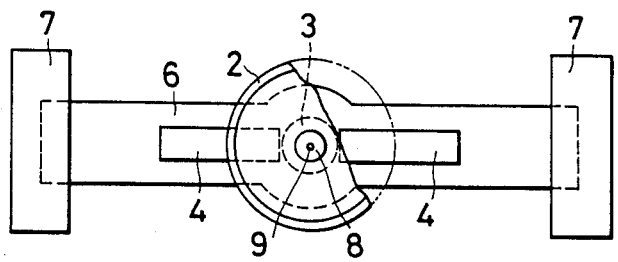
FIG. 2 is a plan view of the hopper and support member of the apparatus of FIG. 1.

A first embodiment of the apparatus for continuous supply of fine powder, viscous fluid or the like at a constant rate according to this invention is illustrated schematically in the block diagram of FIG. 1. FIG. 2 shows a plan view of the same with part of the hopper cut away.

The apparatus for supply of fine powder according to the present invention comprises a hopper 2 for holding a fine powder 1, a diaphragm 6 for supporting the hopper 2, at least one first piezoelectric transducer 4 for vibrating the diaphragm 6, a driver 12 for driving the first piezoelectric transducer 4, at least one second piezoelectric transducer 5 for detecting the vibration frequency of the diaphragm 6 and outputting a signal corresponding to the detected frequency, and a control unit 10 for processing the signal output by the second piezoelectric transducer 5 and feeding the processed signal back to the driver 12.

The hopper 2 is formed at the bottom thereof with a neck 3 constituted in the shape of a cylinder of small diameter and a discharge pipe 8 of a prescribed internal diameter is fitted into the interior of the neck 3. The neck 3 is held within a hole provided in the diaphragm 6 and is so supported by the diaphragm 6. The diaphragm 6 has the first piezoelectric transducers 4 and the second piezoelectric transducers 5 attached to the upper and lower surfaces thereof, respectively.

So that the diaphragm 6 can be efficiently vibrated, it is formed as a thin, resilient plate and is supported at opposite ends by supports 7. The discharge hole of the discharge pipe 8 is in communication with the interior of the hopper 2 and the end thereof within the hopper has a small opening 9 which increases in diameter in the direction of fine powder flow. This arrangement is advantageous in that it suppresses the formation of a bridge by the fine powder in the region of the opening 9. The diameter of the opening 9 constitutes one factor determining the rate of discharge and for realizing control on the $\mu$g order should preferably measure 0.1–1.0 mm.

As the main object of the invention is to provide continuous supply of fine powder at a constant rate on the $\mu$g order, the dimensions of the hopper 2 are dependent on the desired rate of supply and the discharge time. For example, where the hopper 2 has a diameter of 10–20 mm and a height of 20 mm, it becomes possible to continuously operate the apparatus at the discharge rate of 1 mg per hour over a period of ten hours. Moreover, since the apparatus supplies minute amounts of a fine powder, it is preferable for ensuring high-precision metering to make the hopper 2 as light as possible. The hopper 2 thus preferably weighs not more than 1 g. Such a weight can be realized by fabricating the hopper from aluminum.

Figure 3:
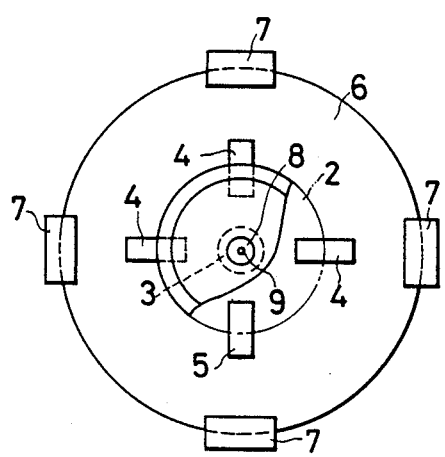
FIG. 3 is a plan view of a second embodiment of the support member.

As the diaphragm 6 is required not only to support the hopper 2 but also to smoothly convey the vibration from the first piezoelectric transducer 4, it is preferably fabricated of beryllium-copper alloy or the like. It can be formed as member with two arms as shown in FIG. 2 or in any of various other shapes including, for example, as a circular member supported at four points by four supports 7, as shown in FIG. 3. To enable the diaphragm 6 to manifest its resilient property to the utmost, the supports 7 are preferably formed of a resilient material such as rubber or, alternatively, as spring members. In the embodiment illustrated in FIG. 3, four piezoelectric transducers are disposed on the diaphragm 6 at points equally spaced on a circle having the opening 9 as its center. Three of these serve as first piezoelectric transducers 4 for vibrating the diaphragm 6 and the remaining one as the second piezoelectric transducer 5 for detecting the vibration.

Figure 4:
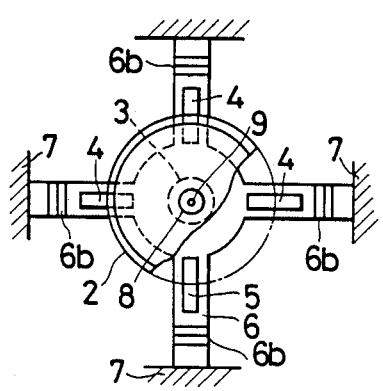
FIG. 4 is a plan view of a third embodiment of the support member.
Figure 5:
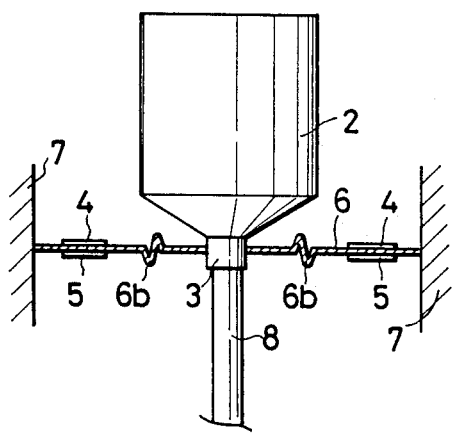
FIG. 5 is a plan view of a fourth embodiment of the support member.

FIG. 4 shows another embodiment of the diaphragm 6 formed as a cross-shaped member with each arm of the cross being provided in the vicinity of the associated support member 7 with a resilient support portion 6b constituted by forming a plurality of waves in the material of the arm. This arrangement further enhances the transfer of vibration to the hopper 2. There can also be employed an arrangement as shown in FIG. 5 wherein the resilient support portions 6b are provided on the diaphragm 6 at positions near the hopper 2, whereby it becomes possible to transmit sufficient vibration to the hopper 2. As will be clear from the foregoing description, the shape and structure of the diaphragm 6 and the positions at which the first and second piezoelectric transducers are provided can be appropriately selected in line with the purpose at hand.

The fine powder 1 to be supplied at a constant rate by the apparatus according to this invention can be of any type insofar as it consists of particles on the $\mu$m order and specifically can be a ceramic powder, a metal powder or a powder of a polymer or pharmaceutical material. Viscous fluids which can be supplied by the apparatus include oils, polymer materials, paints and solvents. The apparatus can also be applied to the supply of magnetic fluids, slurries and other fluids containing fine powders.

As the first and second piezoelectric transducers 4, 5 attached to the diaphragm 6 there can be used conventional ones of, for example, crystal, barium titanate, PZT, lithium niobate. The first and second piezoelectric transducers are of the same type. The dimensions of the piezoelectric transducers is determined with consideration to the number thereof, the positions where they are to be attached to the diaphragm 6, the amount of fine powder to be discharged, the shape of the diaphragm 6, the weight of the hopper 2, and the like.

Where the same fine powder is discharged using the same apparatus, the rate of discharge will depend on the frequency and amplitude of the vibration (the amplitude being proportional to the voltage applied to the piezoelectric transducers). Therefore, the relationship between the rate of discharge and the vibration frequency at each applied voltage and the relationship between the hopper weight including fine powder and the vibration frequency is computed and stored in the control unit 10 in advance.

The apparatus has a supply rate setting unit 11 in which the operator sets the desired rate of fine powder discharge in advance. The supply rate setting unit 11 outputs a signal representing the set discharge rate to the control unit 10 which, on the basis of the relationship between the discharge rate and the vibration frequency stored therein in advance, computes and supplies to the driver 12 a voltage appropriate for producing a vibration of a frequency and amplitude as required for obtaining the present discharge rate. As a result, the first piezoelectric transducers 4 located at prescribed positions on the diaphragm 6 are vibrated at the prescribed frequency and this vibration is transferred to the hopper 2 causing it to vibrate, whereby fine powder 1 is discharged to the exterior through the discharge pipe 8 at a rate corresponding to the frequency of vibration. Of particular significance is that the vibration, sound waves and ultrasonic waves produced by the piezoelectric transducers tend to prevent the formation of a bridge or lump of the fine powder at the opening 9 and to break down any such bridge or lump that should form. Namely, the vibration maintains the fine powder in the region of the opneing 9 in a floating state, thus helping to maintain the flow of the fine powder into the opening 9 substantially constant.

The first piezoelectric transducers 4 also serve as all or part of the oscillator element of the driver 12. These first piezoelectric transducers 4 further supply vibration to the hopper 2 via the diaphragm 6 supporting the same. The vibration frequency is determined by the weight of the hopper 2 and the spring constant of the diaphragm 6 so that the frequency of the driver 12 (i.e. the vibration frequency at first piezoelectric transducers 4) varies depending on the weight of the hopper 2, which means that it varies in response to the rate of discharge of the fine powder 1.

It is known that when a pressure (a tensile, compression or bending force) is applied to a piezoelectric transducer, the vibration frequency and voltage produced by the transducer will vary in proportion to the magnitude of the force. Therefore, when the weight of the hopper 2 changes when it is driven by the first piezoelectric transducers 4 and caused to discharge fine powder, the vibration frequency of the first piezoelectric transducers 4 will vary in proportion to the amount of change. The resolution of this change in the vibration frequency of the piezoelectric transducers is extremely high.

On the other hand, the change in the vibration frequency of the driver 12 is detected by a detector 13 via the second piezoelectric transducer 5. The control unit 10 reads the vibration frequency of the diaphragm 6 detected by the detector 13, calculates the rate of discharge of the fine powder, and compares the vibration frequency set in the driver 12 with the new vibration frequency of the hopper resulting from the change in weight thereof, and adjusts the vibration frequency rate set in the driver 12. In this way, change in the rate of fine powder discharge which would otherwise occur owing to change in the weight of the fine powder in the hopper 2 is suppressed, and the actual amount of fine powder 1 discharged from the discharge tube 8 is maintained at the rate set in the supply rate setting unit 11.

When the hopper 2 is replenished with fresh fine powder, similarly to what was explained earlier, the vibration frequency will decrease because of the change in weight. This change is detected by the second piezoelectric transducer 5 and the control unit 10 uses the signal resulting from this detection to calculate the weight of the hopper 2 and then corrects the vibration frequency produced by the control unit 10 to that corresponding to the calculated weight, in this way restoring the rate of fine powder discharge to the set value.

Thus by this way constantly feeding back to the driver 12 of the first piezoelectric transducers 4 the change in vibration frequency caused by change in the weight of the hopper 2, the continuous supply of fine powder can be maintained at a constant rate.

In the embodiments explained above the frequency of vibration is controlled based on change in the weight of the hopper 2. Since as explained earlier the voltage output by a piezoelectric transducer varies with the pressure applied thereto, it is alternatively possible to detect change in the weight of the hopper 2 from such change in voltage and carry out the control accordingly.

Figure 6:
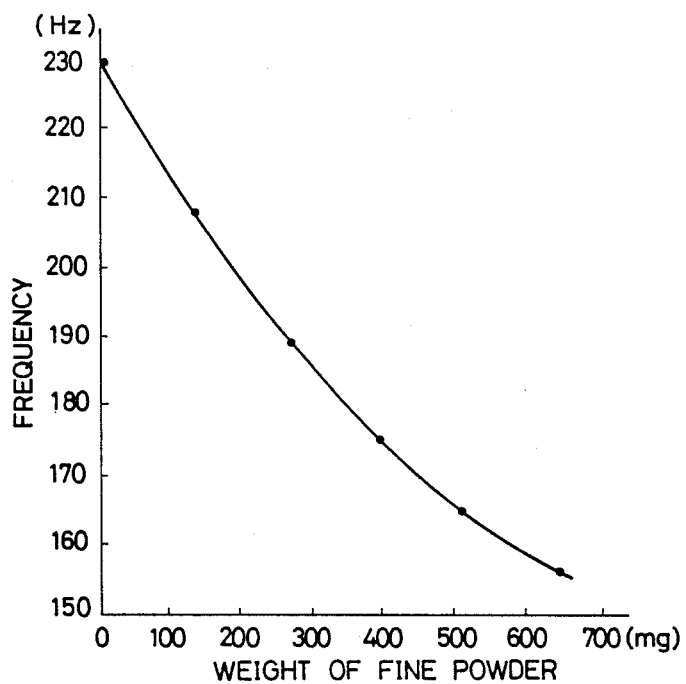
FIG. 6 is graph showing the relationship between change in the weight of the hopper contents and change in vibration frequency.

The graph shown in FIG. 6 shows an example of the relationship between change in weight of the fine powder contained in the hopper and the associated change in vibration frequency in the case of using a barium titanate piezoelectric transducer. While the vibration frequency of the piezoelectric transducer is 230 Hz for an empty hopper, it becomes about 190 Hz when the weight of the fine powder contained in the hopper increases to about 260 mg and 157 Hz when it increases to 650 mg.

As is clear from this graph, the frequency varies by about 1 Hz for every 8.6–8.9 mg change in hopper weight. Thus if discharge of fine powder is controlled such that the vibration frequency changes by 1 Hz over a period of ten minutes, it becomes possible to continuously supply a minute amount of fine powder at a discharge rate of approximately 14.5 μg per second.

As explained in the foregoing, in the apparatus according to the present invention change in the frequency or voltage of a piezoelectric transducer which applies vibration to a hopper is detected and the detected change is fed back to the oscillator used for driving the piezoelectric transducder so as to constantly maintain the rate of discharge of fine powder from the hopper at a fixed rate. As the apparatus is capable of controlling the discharge of fine powder on the microgram order, it enables exceedingly small amounts of fine powder and the like to supplied at a constant rate.

The apparatus according to the invention can be expected to have very considerable industrial effect since it responds to a recent strong need that has arisen for means to supply minutes amounts of powders, fluids etc. in such wide-ranging fields as electronics, medical engineering, mechanical engineering and the paint industry.

The invention will now be explained with respect to non-limitative examples.

EXAMPLE 1

An aluminum hopper measuring 12 mm in internal diameter, 13 mm in external diameter and 12 mm in height was charged with zirconia ($ZrO_2$) of a mean grain diameter of 20 μm to a combined weight of the hopper, discharge tube and zirconia of 300 mg. The diameter of the discharge orifice of the discharge tube was 0.35 mm.

The hopper was supported at the center of a cross-shaped beryllium-copper diaphragm with each arm length of cross 25 mm and 0.1 mm in thickness. The diaphragm was supported at four points by spring members and had four approximately 2×5 mm PZT piezoelectric transducers attached to the surface of each arm of the cross. Three of the piezoelectric transducers were used for providing vibration and one for detecting vibration.

When a voltage of 7 V was applied to the three PZT piezoelectric transducers for vibration they vibrated at a frequency of 185 Hz. Data indicating that the vibration frequency would increase by 1 Hz per each decrease of 9 mg in the weight of the hopper and its contents was stored in the control unit, and the frequency produced by the driver was automatically controlled on the basis of the vibration frequency detected by the one piezoelectric transducer for detection.

Figure 7:
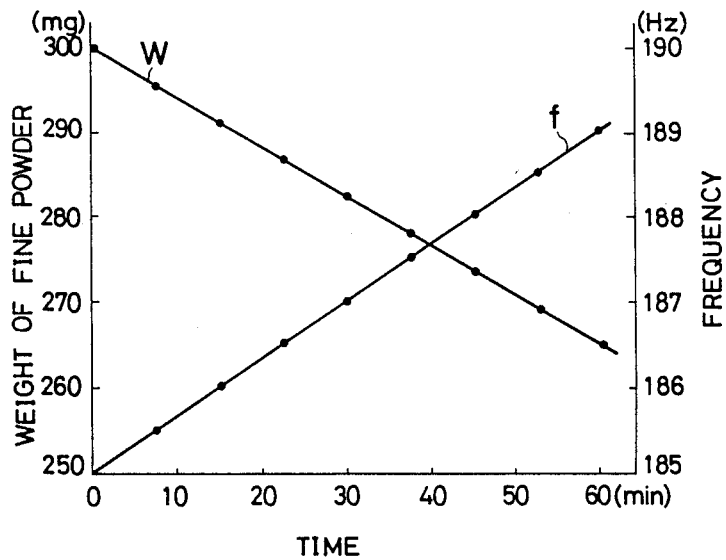
FIG. 7 is a graph showing the relationship between the rate of fine powder discharge and the vibration frequency.

When the apparatus was operated for 60 minutes under the aforesaid conditions, the relationship between the change in hopper weight (i.e. the weight of the zirconia) and the vibration frequency was found to be as shown in the graph of FIG. 7.

More specifically, the weight of the hopper and the vibration frequency were monitored once every 7.5 minutes, whereby it was found that both parameters varied linearly, with the weight decreasing 36 mg and the frequency increasing 4 Hz over the one-hour period. Thus the rate of zirconia discharge was a substantially constant 10 μg per second.

EXAMPLE 2

The apparatus of Example 2 having the similar constructions to those of the Example 1 except the cross-shaped diaphragm having the arm length of 15 mm was used and the change in the amount of zirconia discharged from the hopper per hour and the change in frequency accompanying this discharge were monitored as the drive voltage applied to the piezoelectric transducers for vibration was varied from 6 to 20 V.

Figure 8:
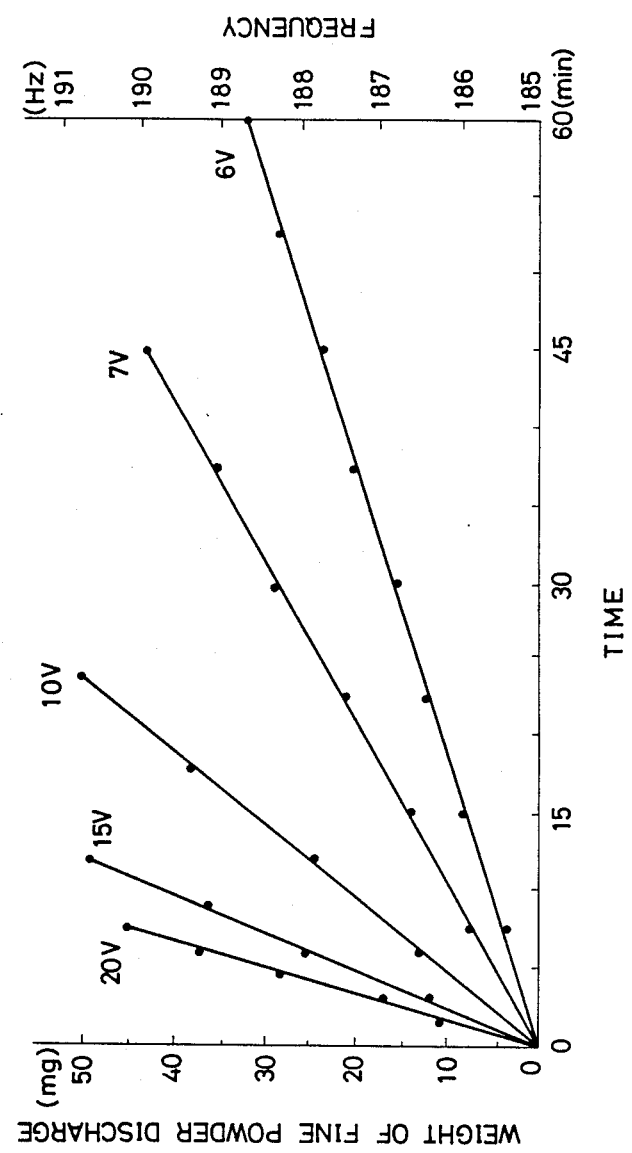
FIG. 8 is a graph showing the relationship between the drive voltage of the piezoelectric transducer and the rate of fine powder discharge.

The results are shown in the graph of FIG. 8, from which it will be noted that 45 mg of zirconia powder was discharged in just over 7 minutes at an applied voltage of 20 V and about 32 mg of zirconia powder was discharged over one hour at an applied voltage of 6 V.

The rate of zirconia discharge per second at different applied voltages was as shown in the following table.

| Drive voltage (V) | Discharge rate (µg/sec) |
| --- | --- |
| 20 | 100 |
| 15 | 68 |
| 10 | 35 |
| 7 | 16 |
| 6 | 9 |

What is claimed is:

1. An apparatus for continuously supplying fine powder, viscous fluid or the like at a constant rate comprising a hopper, a diaphragm for supporting the hopper, at least one first piezoelectric transducer disposed on the diaphragm of supplying vibration to the hopper, at least one second piezoelectric transducer disposed on the diaphragm for detecting the frequency of vibration of the diaphragm, and a driver for driving the first piezoelectric transducer, wherein change in the frequency of the first piezoelectric transducer resulting from change in the pressure applied to the first piezoelectric transducer by the fine powder, viscous fluid or the like in the hopper is detected by the second piezoelectric transducer and the detection signal is fed back to the driver for the first piezoelectric transducer to control the rate of discharge of the fine powder, viscous fluid or the like from the hopper to a constant rate.

2. An apparatus according to claim 1, wherein the first and second piezoelectric transducers are constituted of crystal, barium titanate, PZT, or lithium or niobate.

3. An apparatus according to claim 1, wherein a plurality of piezoelectric transducers are provided on one surface of the diaphragm, one thereof is used as the second piezoelectric transducer for detecting the frequency of vibration and the remainder thereof are used as the first piezoelectric transducers for supplying vibration.

4. An apparatus according to claim 1, wherein the diameter of the hopper is 10–20 mm.

5. An apparatus according to claim 1, wherein the hopper has a 0.1–1.0 mm discharge orifice.

* * * * *